Aug. 12, 1969    J. D. McGHEE    3,461,380
THERMOCOUPLE REFERENCE JUNCTION COMPENSATING CIRCUITS
Filed Aug. 24, 1967

INVENTOR
JOHN D. McGHEE,
BY Robert A. Reston
AGENT

United States Patent Office 3,461,380
Patented Aug. 12, 1969

3,461,380
THERMOCOUPLE REFERENCE JUNCTION
COMPENSATING CIRCUITS
John D. McGhee, Plymouth Meeting, Pa., assignor to
E. I. du Pont de Nemours and Company, Wilmington,
Del., a corporation of Delaware
Filed Aug. 24, 1967, Ser. No. 662,969
Int. Cl. G01r 17/02
U.S. Cl. 323—68           5 Claims

ABSTRACT OF THE DISCLOSURE

In a thermocouple system, a reference junction compensating circuit comprising a semiconductor rectifying device, e.g., a transistor having a linear-negative temperature coefficient, a current source for supplying a substantially constant current to the device in a forward direction or direction of high conductivity, and a voltage divider connected in parallel with the device, the output of the divider compensating for variations in the reference junction temperature from a predetermined value, generally 0° C.

---

The voltage output of a thermocouple is proportional to the temperature difference between measuring and reference junctions (commonly designated hot and cold junction, respectively). If the reference junction is held at a constant temperature, for example, at 0° C. by an ice bath, the output will vary only with the temperature of the measuring junction. This is inconvenient, however, and accuracy will be limited, if the ice bath is not properly maintained.

By supplying a voltage that directly compensates for variances in the thermocouple voltage produced by temperature variations at the reference junction, the need for a constant reference junction temperature is eliminated. In the present invention, a reference junction compensating circuit comprises a semiconductor rectifying device maintained at the reference junction temperature, said device having a voltage drop in the high conductivity direction that varies substantially linearly with temperature, a current source for supplying a substantially constant current through said device in the high conductivity direction to produce said voltage drop and a voltage divider having an output terminal, said divider connected in parallel with said device, the output voltage of said source adjusted such that the voltage at said output terminal is zero when said device is a a predetermined fixed reference temperature and said voltage divider adjusted such that the voltage at said output terminal directly compensates for variances in the thermocouple voltage caused by temperature changes at the reference junction.

Figure 1:
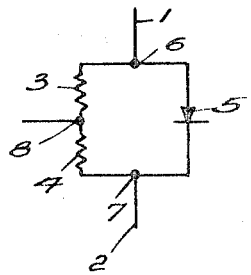
Figure 2:
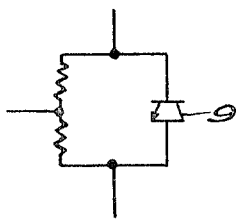
Figure 3:
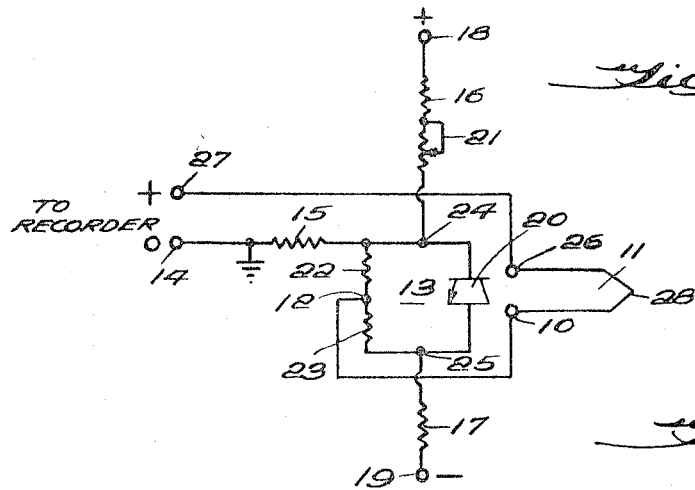
Figure 4:
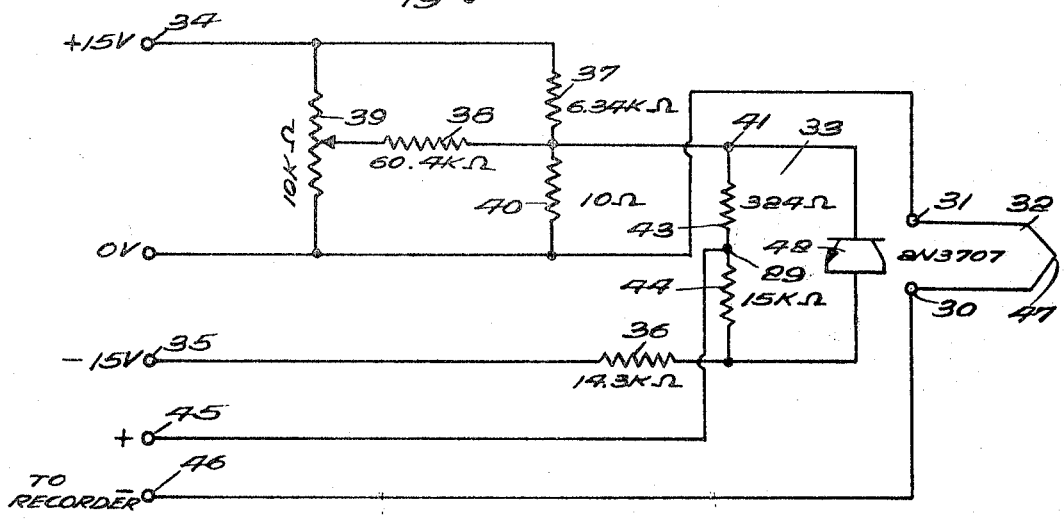

For a better understanding of the invention, reference is made to the following detailed description and attendant drawings wherein:

FIGURE 1 illustrates a temperature-dependent voltage supply circuit incorporating a diode;
FIGURE 2 illustrates a temperature-dependent voltage supply circuit incorporating a transistor;
FIGURE 3 shows an embodiment of the present invention; and
FIGURE 4 shows another embodiment of the invention.

In FIGURE 1, a relatively constant current enters through conductor 1 and exits through conductor 2. Since the total resistance of resistors 3 and 4 is large relative to the effective resistance of diode 5, the voltage drop between junctions 6 and 7 is determined by the drop across diode 5 in the forward direction. As the temperature of the diode increases, this drop decreases substantially linearly. Thus, by appropriate selection of resistors 3 and 4, the voltage at output terminal 8, positioned between said resistors, can be set to vary with temperature at any rate less than that of diode 5. If desired, a resistor having a variable tap may be used instead of resistors 3 and 4 output terminal 8, thereby allowing adjustment of the output voltage.

In a preferred circuit, FIGURE 2, transistor 9 having a collector and emitter connected together is substituted for the diode of the previous figure. Although both diodes and transistors, constructed from the same materials have nearly the same average temperature-dependent voltage drops, applicant has found that the voltage drop across a transistor is less dependent upon the particular unit selected. Either PNP or NPN transistors may be used as long as the current passes through the transistor in the high conductivity direction.

As readily apparent to one skilled in the art, any other semiconductor rectifying device may be substituted for the diode or transistor. Desirable semiconductor materials include, for example, germanium, silicon, and alloys thereof. Silicon is preferred over germanium since it exhibits a much wider range of temperature-voltage linearity (about —55° C. to 150° C.).

As shown in FIGURE 3, terminal 10 on the negative side of thermocouple 11 is coupled directly to output terminal 12 of reference junction compensating circuit 13 (the circuit of FIGURE 2). The top side of circuit 13 is connected to grounded recorded terminal 14 via resistor 15. A substantially constant current is supplied to circuit 13 by using large-value resistors 16 and 17 and applying a fixed voltage between terminals 18 and 19. Resistors 16 and 17 are selected such that the voltage at terminal 12 is at or near ground when transistor 20 is at a preselected reference temperature, generally 0° C. Small variable resistor 21 is provided as a zero adjustment. (It is necessary, for proper compensation, that the voltages at output terminal 12 and recorder terminal 14 be equal at this reference temperature.) Resistors 22 and 23 with output terminal 12 form a voltage divider across transistor 20. The total resistance of resistors 22 and 23 should be much greater than the effective resistance of transistor 20. This allows the voltages at summing points 24 and 25—and necessarily at output terminal 12—to be substantially a linear function of temperature as determined by transistor 20. The relative values of resistors 22 and 23 fix the magnitude of the temperature-voltage change at output terminal 12. By maintaining transistor 20 and the reference juniction, formed by terminals 10 and 26, at the same temperature and selecting the appropriate circuit parameters, the voltage change at output terminal 12 will be equal and opposite to the change in voltage across terminals 10 and 26 when the reference junction temperature only is varied. The voltage at recorder terminal 27 is then directly proportional to the difference between the temperature of measuring junction 28 and the preselected reference temperature. Any means which will measure and/or record the voltage drop across terminals 27 and 14 may be connected to the same, thereby indicating the temperature at the measuring junction.

In the specific embodiment of FIGURE 4, the voltage at output terminal 29 compensates for temperature changes at reference junction 30–31 of Chromel-Alumel thermocouple 32. Compensating circuit 33 is supplied with a current by a plus and minus 15-volt source at terminals 34 and 35, respectively. Most of the 30-volt drop of the system occurs across resistors 36, 37, 38, and 39 thereby producing a substantially constant current flow through circuit 33. Resistor 40, having its lower end tied to ground, provides a small positive bias at junction 41. Resistors 38 and 39 form a zero adjustment so that the voltage at output terminal 29 can be set at ground when transistor 42 is at the preselected reference temperature, 0° C. (At this temperature, the voltage drops across resistors 40 and 43 will be equal.) As connected, the voltage drop across transistor 42 changes about −2 mv./° C. By divider action between resistors 43 and 44, the voltage drop across transistor 43 will change the desired −40 mv./° C. The voltage at output terminal 29 is therefore a positive linear function of the temperature of transistor 42, being equal and opposite to the voltage change across terminals 30–31 with reference junction temperature. Since transistor 42 and reference junction 30–31 are always at the same ambient temperature, the voltage drop across recorder terminals 45 and 46 will be directly proportional to the temperature of measuring junction 47.

The embodiments shown in FIGURES 3 and 4 are merely representative of a number of different ways for connecting the reference junction compensating circuit and a thermocouple in accordance with the present invention. It will be understood that various changes in the materials, steps, details, arrangement of parts, etc., which have been herein described and illustrated in order to explain the nature of the invention, may be made by those skilled in the art within the principle and scope of the invention.

I claim:
1. In combination with a thermocouple having measuring and reference junctions, a reference junction compensating circuit comprising a semiconductor rectifying device maintained at the reference junction temperature, said device having a voltage drop in the high conductivity direction that varies substantially linearly with temperature, a current source for supplying a substantially constant current through said device in the high conductivity direction to produce said voltage drop, a pair of serially-coupled resistors connected in parallel with said device and an output terminal electrically positioned between said resistors, the output voltage of said source adjusted such that the voltage at said output terminal is zero when said device is at a predetermined fixed reference temperature and said resistors selected such that the voltage at said output terminal directly compensates for variances in the thermocouple voltage caused by temperature changes at said reference junction.

2. The reference junction compensating circuit of claim 1 wherein said semiconductor rectifying device is a diode.

3. The reference junction compensating circuit of claim 1 wherein said semiconductor rectifying device is a transistor.

4. The reference junction compensating circuit of claim 1 wherein said semiconductor device is a transistor having an emitter and collector connected together.

5. In combination with a thermocouple having measuring and reference junctions, a reference junction compensating circuit comprising a semiconductor rectifying device maintained at the reference junction temperature, said device having a voltage drop in the high conductivity direction that varies substantially linearly with temperature, a current source for supplying a substantially constant current through said device in the high conductivity direction to produce said voltage drop and a voltage divider having an output terminal, said divider connected in parallel with said device, the output voltage of said source adjusted such that the voltage at said output terminal is zero when said device is at a predetermined fixed reference temperature and said voltage divider adjusted such that the voltage at said output terminal directly compensates for variances in the thermocouple voltage caused by temperature changes at said reference junction.

References Cited

UNITED STATES PATENTS

| | | |
|---|---|---|
| 2,571,458 | 10/1951 | Lawrence, et al. _____ 324—105 |
| 2,871,701 | 2/1959 | Knudsen _____ 324—105 |
| 3,207,984 | 9/1965 | Tolliver. |

JOHN F. COUCH, Primary Examiner

G. GOLDBERG, Assistant Examiner

U.S. Cl. X.R.

73—362; 324—105